United States Patent
Safai

(10) Patent No.: US 10,989,675 B1
(45) Date of Patent: Apr. 27, 2021

(54) SYSTEM AND METHOD FOR MONOCHROMATIC X-RAY GAS EXCITATION BOND INSPECTION

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 15 days.

(21) Appl. No.: 16/687,606

(22) Filed: Nov. 18, 2019

(51) Int. Cl.
*G01N 23/04* (2018.01)
*G01N 23/18* (2018.01)

(52) U.S. Cl.
CPC .......... *G01N 23/18* (2013.01); *G01N 23/043* (2013.01); *G01N 2223/1016* (2013.01); *G01N 2223/30* (2013.01); *G01N 2223/406* (2013.01); *G01N 2223/413* (2013.01); *G01N 2223/421* (2013.01); *G01N 2223/425* (2013.01); *G01N 2223/427* (2013.01); *G01N 2223/505* (2013.01); *G01N 2223/615* (2013.01); *G01N 2223/629* (2013.01); *G01N 2223/646* (2013.01)

(58) Field of Classification Search
None
See application file for complete search history.

(56) References Cited

U.S. PATENT DOCUMENTS

| 7,520,178 | B2 * | 4/2009 | Ohno | G01N 19/08 73/799 |
|---|---|---|---|---|
| 9,857,583 | B2 | 1/2018 | Safai et al. | |
| 2008/0115597 | A1 * | 5/2008 | Ohno | G01M 5/0025 73/865.8 |

FOREIGN PATENT DOCUMENTS

| CN | 105548214 A | * | 5/2016 |
| CN | 109719366 A | * | 5/2019 |
| JP | H01202612 A | * | 8/1989 |

OTHER PUBLICATIONS

Berthe et al., State-of-the-art laser adhesion test (LASAT), Nondestructive Testing and Evaluation, vol. 26, Nos. 3-4, Sep.-Dec. 2011, 303-317.

* cited by examiner

*Primary Examiner* — Thomas R Artman
(74) *Attorney, Agent, or Firm* — MH2 Technology Law Group LLP

(57) ABSTRACT

A system and method for determining the strength of a bond joining a composite structure is provided. The system includes a gas gun produces a short gas pulse directed normal to a surface of the composite structure and that creates a compression wave through the composite structure; a monochromatic x-ray system produces a monochromatic x-ray that is incident at an angle to the surface and that passes through the composite structure; a scintillator screen receives transmitted x-rays that pass through the composite structure; a mirror receives and magnifies radiation emitted from the scintillator screen; a detector receives the radiation from the scintillator screen; an electronic processor configured to process the radiation detected by the detector; and a synchronization controller configured to synchronize operation of the gas gun, the monochromatic x-ray system, and the detector.

20 Claims, 7 Drawing Sheets

SYSTEM AND METHOD FOR MONOCHROMATIC X-RAY GAS EXCITATION BOND INSPECTION

FIELD

The present teachings generally relate to non-destructive inspection (NDI) systems for composite materials, and more particularly to a monochromatic X-ray bond inspection system.

BACKGROUND

Using bonded materials, such as composites, as structural materials can provide design flexibility and reduced cost. Inspection of composite materials, particularly of the bonds between them can be challenging.

Bonds are typically inspected using some ultrasonic method, either looking at attenuation through or reflections from the part/adhesive interface.

There is a need to develop techniques that allows for verification of bonds connecting composite structures.

SUMMARY

In accordance with examples of the present disclosure, a system for determining the strength of a bond joining a composite structure is provided. The system comprises a gas gun configured to produce a short gas pulse directed normal to a surface of the composite structure and that creates a compression wave through the composite structure, wherein the gas gun is arranged at an angle; a monochromatic x-ray system configured to produce a monochromatic x-ray that is incident at an angle to the surface and that passes through the composite structure; a scintillator screen configured to receive transmitted x-rays that pass through the composite structure; a mirror configured to reflect radiation emitted from the scintillator screen; a magnifying lens configured to magnify the reflect radiation from the mirror; a detector configured to receive the radiation from the magnifying lens; an electronic processor configured to process the radiation detected by the detector; and a synchronization controller configured to synchronize operation of the gas gun, the monochromatic x-ray system, and the detector.

In accordance with examples of the present disclosure, a method for determining the strength of a bond joining a composite structure is provided. The method comprises producing a short gas pulse by a gas gun that is directed normal to a surface of the composite structure and that creates a compression wave through the composite structure, wherein the gas gun is arranged at an angle; producing a monochromatic x-ray by a monochromatic x-ray system to that is incident at an angle to the surface and that passes through the composite structure; receiving transmitted x-rays by a scintillator screen through the composite structure; receiving radiation emitted from the scintillator screen by a mirror; magnifying the radiation reflected by the mirror from the scintillator screen; detecting the radiation from the scintillator screen by a detector; processing the radiation detected by the detector; and synchronizing operation of the gas gun, the monochromatic x-ray system, and the detector.

In some examples, the compression wave is reflected at a second surface of the composite structure and is reflected as a tensile wave.

In some examples, the synchronization controller is configured to produce a x-ray trigger signal to control activation of the monochromatic x-ray system, a gas gun trigger signal to control activation of the gas gun, and a detector trigger signal to control activation of the detector, such that the detector is operable to receive the radiation from the Scintillator during a first time period prior to activation of the gas gun and a second time period during either propagation of the compression wave first then the tensile wave from the reflection of the tensile wave through the composite structure.

In some examples, the gas gun is configured to compress carbon dioxide.

In some examples, the angle is between about 30° to about 60°, or about 45°.

In some examples, the compression wave and the x-rays are directed to a same portion of the weak bond.

In accordance with examples of the present disclosure, a method for determining the strength of a bond joining a composite structure. The method comprises producing a gas pulse that is directed normal to a surface of the composite structure and that creates a compression wave through the composite structure; producing a monochromatic x-ray that is incident at an angle to the surface and that passes through the composite structure; detecting radiation from a scintillator screen based on the x-ray; processing the radiation based on the detecting; and determining the strength of the bond based on the processing, wherein the gas pulse, the x-ray, and the detecting are synchronized. In some examples, the compression wave is reflected at a second surface of the composite structure and is reflected based as a tensile wave. In some examples, the gas pulse, the x-ray, and the detecting are synchronized by producing a x-ray trigger signal to control activation of a monochromatic x-ray system, a gas gun trigger signal to control activation of a gas gun, and a detector trigger signal to control activation of a detector. In some examples, the detector is operable to receive the radiation from the scintillator screen during a first time period prior to activation of the gas gun and a second time period during either propagation of the compression wave first then a tensile wave from the reflection of the tensile wave through the composite structure. In some examples, the angle is between about 30° to about 60°. In some examples, the compression wave and the x-ray are directed to a same portion of the bond.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

It should be noted that some details of the figures have been simplified and are drawn to facilitate understanding of the present teachings rather than to maintain strict structural accuracy, detail, and scale.

DETAILED DESCRIPTION

In accordance with examples of the present disclosure, a NDI monochromatic X-ray bond imaging inspection system is provided to determine a bond strength between bonded parts. The NDI monochromatic X-ray bond imaging inspection system uses X-ray images taken before and during or after probing by a gas excitation system to determine the bond strength. This approach allows for a non-destructive inspection system that can be used at or near a location of bonding to determine the strength of the bond and/or detect inconsistencies to the bond that occurs in response to the contact with a compression wave and/or tensile wave. If the inspection reveals that the bond is separated during excitation because of a microfracture or delamination, then the quality of the bond can be determined to be faulty, i.e., the bond did not pass inspection. Alternatively, the bond could contain inconsistencies. If the inspection reveals that the bonded area is not fractured or broken, then the strength of the bond can be determined, i.e., the bond passes or does not pass inspection depending on a threshold to determine if a bond passes. In some examples, a predetermined tension force can be applied to the bond. The predetermined force can be about 30% to about 70% of the force required to break an ideal bond. The bond can then be inspected as described herein. The parts being bonded can be employed in a wide range of industries, including, but are not limited to, aerospace industries.

Figure 1:
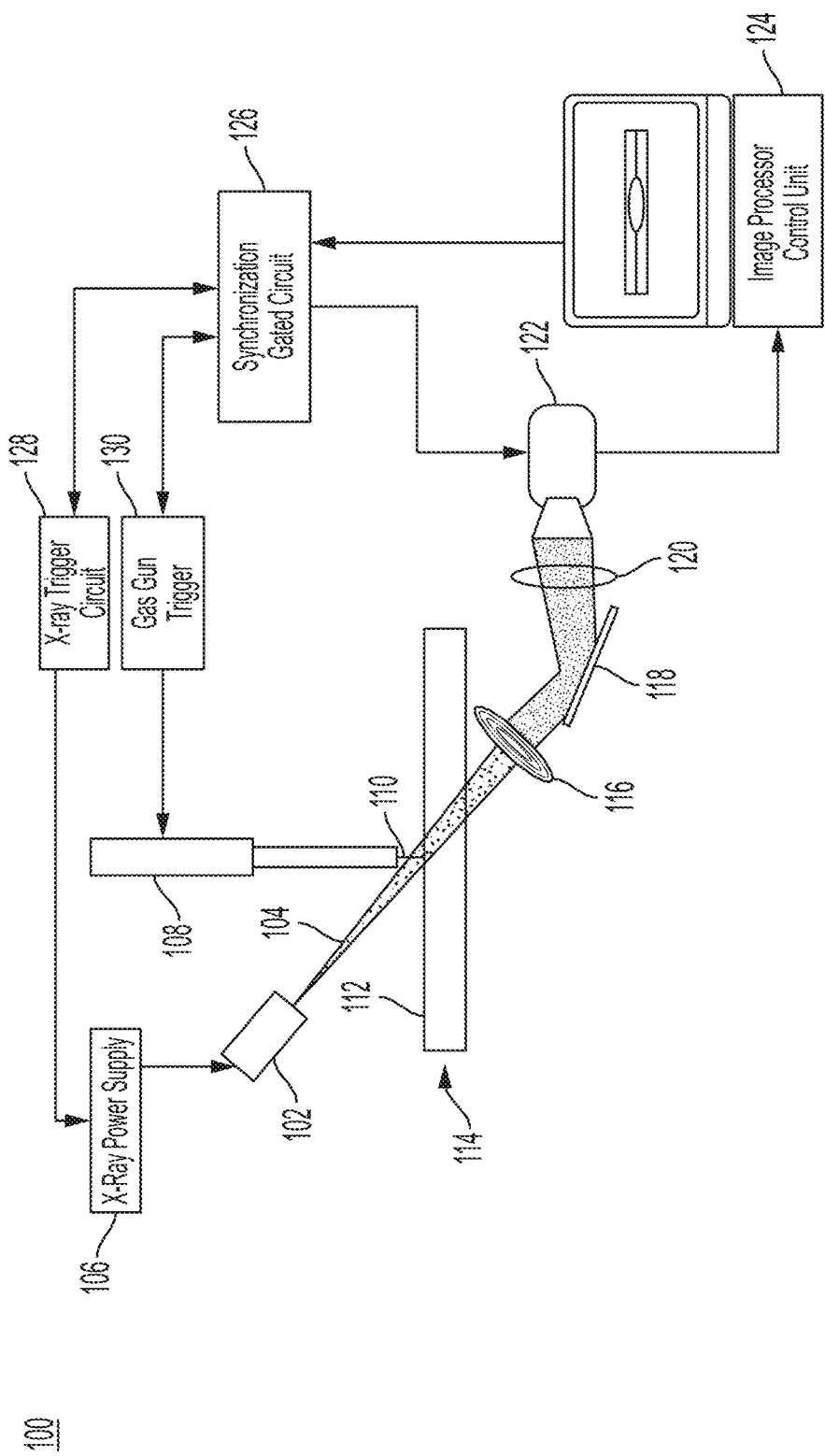
FIG. 1 shows a monochromatic X-ray bond imaging inspection system with high compressed short pulse gas excitation, according to examples of the present disclosure.

FIG. 1 shows a monochromatic X-ray bond imaging inspection system 100 with high compressed short pulse gas excitation, according to examples of the present disclosure. System 100 comprises monochromatic X-ray system 102 that is configured to produce monochromatic X-ray beam 104. X-ray beam is generally a relatively short pulse with high energy X-rays and a narrow "beam-like" output cone. Monochromatic X-ray system 102 is powered by X-ray power source 106. The system 100 also comprises gas gun 108 that comprises gas nozzle 110 at one end of gas gun 108. Gas gun 108 is configured to produce high compression short pulse gas that produces a compression stress wave in composite material 114. In one non-limiting example, gas gun 108 can be single bore barrel, about 2-3 meters long, pressurized with nitrogen, argon or helium. In another examples, gas gun 108 can be a ballistic gas gun that uses compressed air as a propellant and comprises a cylindrical barrel, a quick release valve to release the trapped air, and a nitrogen gas-derived (or similar gas) solenoid value to operate the quick release valve.

The compressive stress wave propagates through composite material 114 and is reflected off a back free surface as a tensile wave. The reflected tensile wave passes through the bond and is used to integrate the adhesive bond at a selected strength value. In one non-limiting example, gas gun 108 is configured to provide the high compression short pulse gas at a perpendicular angle to surface 112 of composite material 114 and monochromatic X-ray system 102 is configured to produce monochromatic X-ray beam 104 at an angle of between about 30° to about 60° relative to the high compression short pulse gas. As shown in FIG. 1, the angle is about 45°.

Monochromatic X-ray beam 104 passes through composite material 114 and is received at high speed X-ray scintillator screen 116. Radiation from X-ray scintillator screen 116 (typically in the visible wavelength) is generated and reflected by mirror for magnification 118, conditioned by magnification lens 120, and received by detector 122, such as an image intensifying camera. Output of detector 122 is provided to image processor control unit 124. For example, detector 122 can be a Princeton Instruments PIXIS XF camera system, which provides for a low-noise camera that uses front- and back-illuminated CCDs for indirect imaging of x-rays via phosphor screens and other Lambertian sources and provides for operation at 100 kHz or 2 MHz. Other similar cameras can also be used.

Monochromatic X-ray system 102 is synchronized using synchronization gated circuit 126. Synchronization gate circuit 126 provides for synchronization of the gas firing with image camera detector integration time for bond imaging during excitation. The synchronization provides for the ability of detector 122 to detect monochromatic X-ray beam 104 as the high compression short pulse gas is provided to composite material 114. Synchronization gated circuit 126 is configured to produce X-ray trigger signal 128 that controls activation and synchronization of X-ray power source 106 and gas gun trigger signal 130 that controls activation and synchronization of gas gun 108, such that detector 122 is operable to receive the radiation from the scintillator screen during a first time period prior to activation of gas gun 108 and a second time period during either propagation of the compression wave first then the tensile wave from the reflection of the tensile wave through composite material 114.

Figure 2:
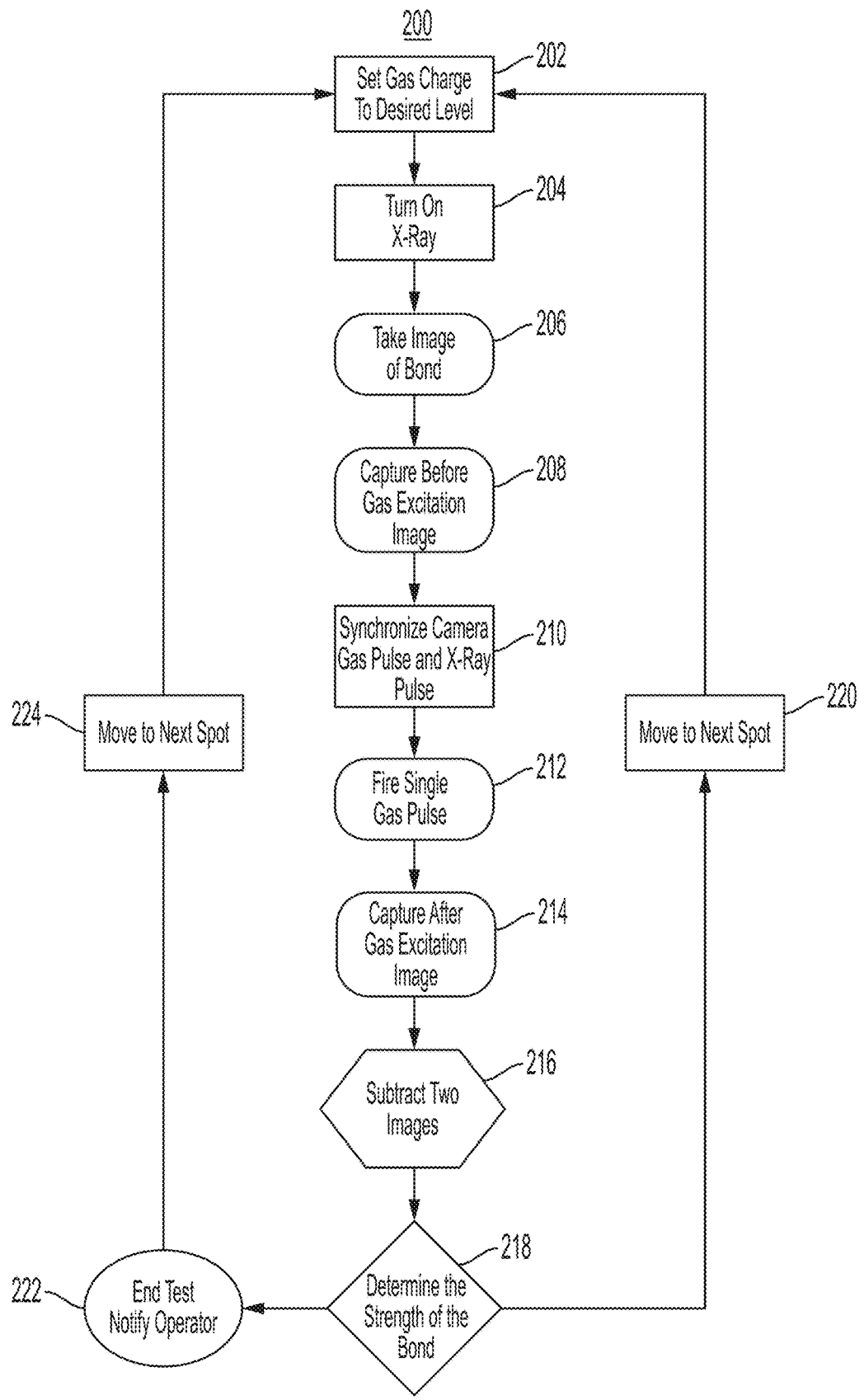
FIG. 2 shows a method for inspecting a bond using monochromatic X-ray system, according to examples of the present disclosure.

FIG. 2 shows a method 200 for inspecting and determining the strength of a bond using monochromatic X-ray system 102, according to examples of the present disclosure. Method 200 begins by setting, at 202, a gas charge to a desired level. Method 200 continues by turning on, at 204, the X-ray system. Method 200 continues by taking, at 206, an image of the bond. Method 200 continues by capturing, at 208, an image before gas excitation. Method 200 continues by synchronizing, at 210, the camera, the gas pulse, and the X-ray pulse. Method 200 continues by firing, at 212, a signal gas pulse. Method 200 continues by capturing, at 214, an image after gas excitation. Method 200 continues by subtracting, at 216, the images acquired by 206 and 214, respectively. By subtracting an x-ray image of bond prior to stress and during the stress, the difference between the images can show the bond much better. This technique is a pixel by pixel technique that can use a full array system. Method 200 continues by determining, at 218, the strength of the bond based on the difference of the two images. If the results of the determination at 218 is sufficiently strong (above a predetermined threshold), then method 200 continues by moving, at 220, to a next spot for inspection. If the results of the determination 218 shows the bond to be below the predetermined threshold, then method 200 continues by ending the test and notifying an operator at 222. Alternatively, the method may also continue the test, at 224, after finding a bond to be below a threshold standard to determine the strength of the other bonds.

Figure 3:
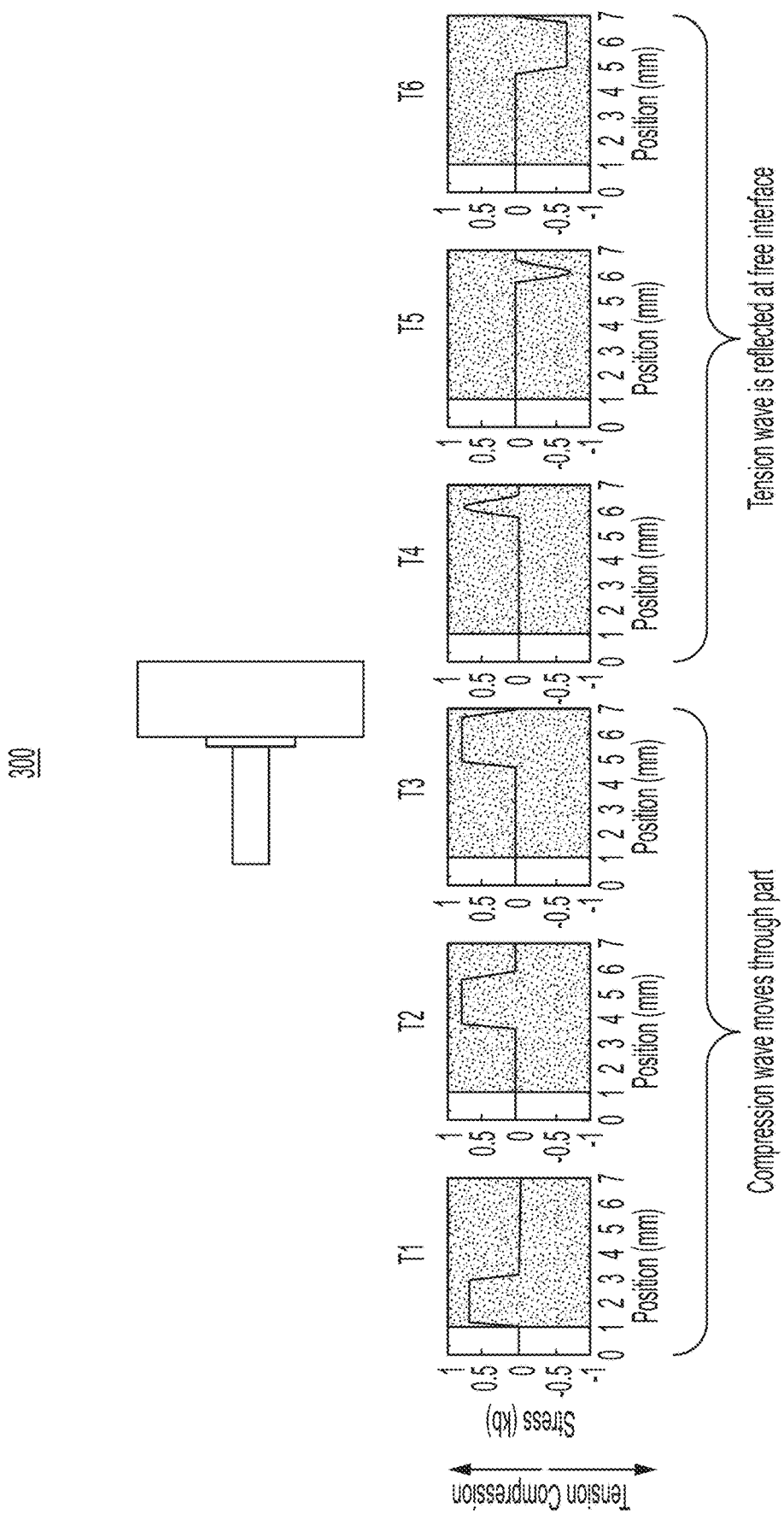
FIG. 3 show the progression of a compression wave and a tension wave produced by the high compression short pulse gas through composite material, according to examples of the present disclosure.

FIG. 3 show the progression 300 of a compression wave and a tension wave produced by the high compression short pulse gas through composite material 114, according to examples of the present disclosure. As shown in FIG. 3, the compression wave moves through the composite material 112 during time intervals denoted by T1 through T3. Once the compression wave is incident of the opposite free surface of composite material 114, the compression wave is reflected back as a tension wave during time intervals denoted by T4 through T6.

Figure 4:
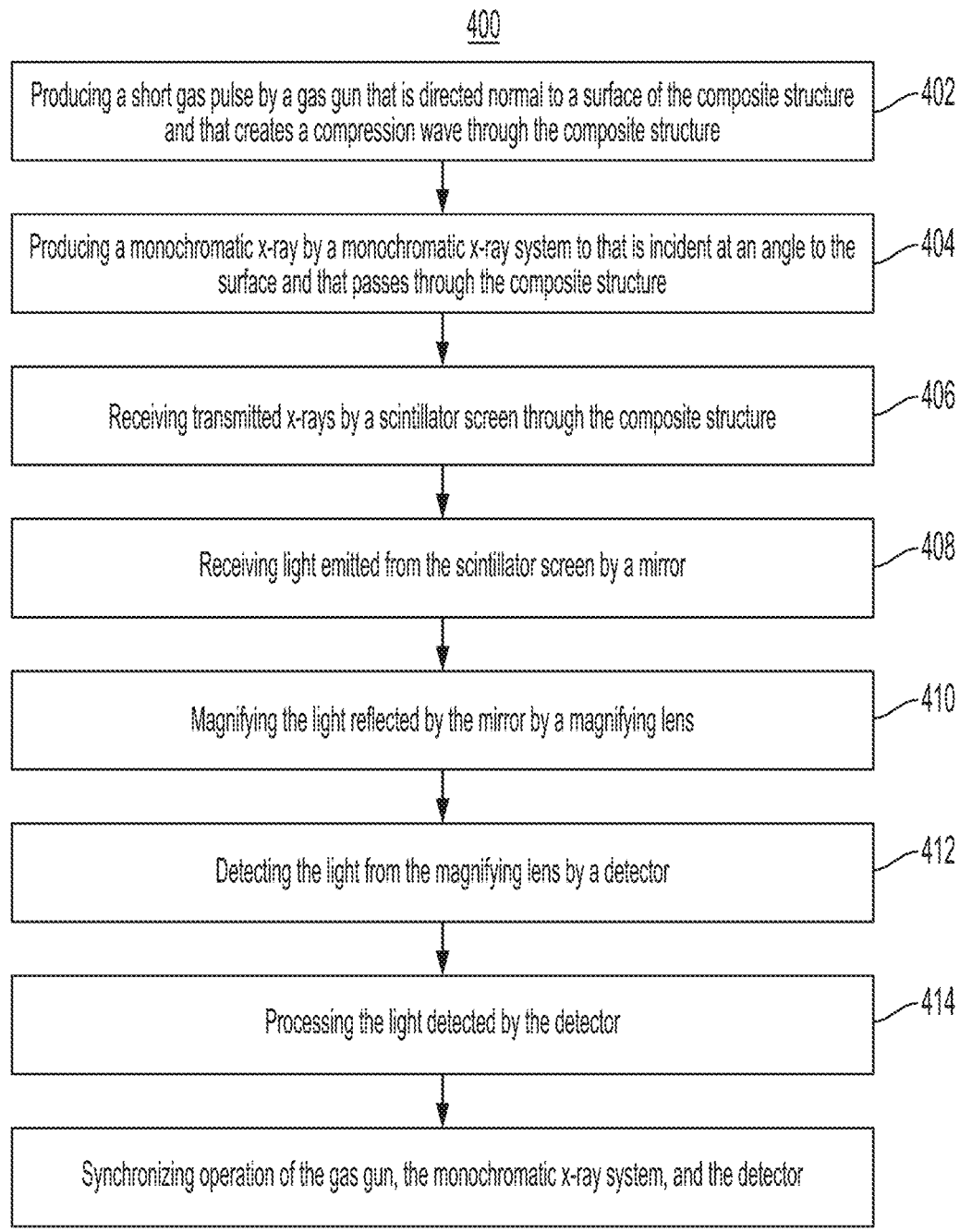
FIG. 4 shows method for determining the bond strength of a bond joining a composite structure, according to examples of the present disclosure.

FIG. 4 shows method 400 for detecting a strength of a bond joining a composite structure, according to examples of the present disclosure. Method 400 begins by producing, at 402, a short gas pulse by a gas gun that is directed normal to a surface of the composite structure and that creates a compression wave through the composite structure. The gas gun is configured to compress as gas, such as carbon dioxide. The gas gun is arranged at an angle, for example, the angle is between about 30° to about 60°, or about 45°. The compression wave is reflected at a second surface of the composite structure and is reflected based as a tensile wave.

Method 400 continues by producing, at 404, a monochromatic x-ray by a monochromatic x-ray system that is incident at an angle to the surface and that passes through the composite structure. The compression wave and the x-rays are directed to a same portion of the bond line.

Method 400 continues by receiving, at 406, transmitted x-rays by a scintillator screen through the composite structure. Method 400 continues by receiving, at 408, radiation emitted from the scintillator screen by a mirror. Method 400 continues by magnifying, at 410, the radiation reflected by the mirror by a magnifying lens. Method 400 continues by detecting, at 412, the radiation from the scintillator screen by a detector. Method 400 continues by processing, at 414, the radiation detected by the detector.

Method 400 continues by synchronizing, at 416, operation of the gas gun, the monochromatic x-ray system, and the detector. The synchronizing produces a x-ray trigger signal to control activation of the monochromatic x-ray system, a gas gun trigger signal to control activation of the gas gun, and a detector trigger signal to control activation of the detector, such that the detector is operable to receive the radiation from the scintillator screen during a first time period prior to activation of the gas gun and a second time period during either propagation of the compression wave first then the tensile wave from the reflection of the tensile wave through the composite structure.

Figure 5A:
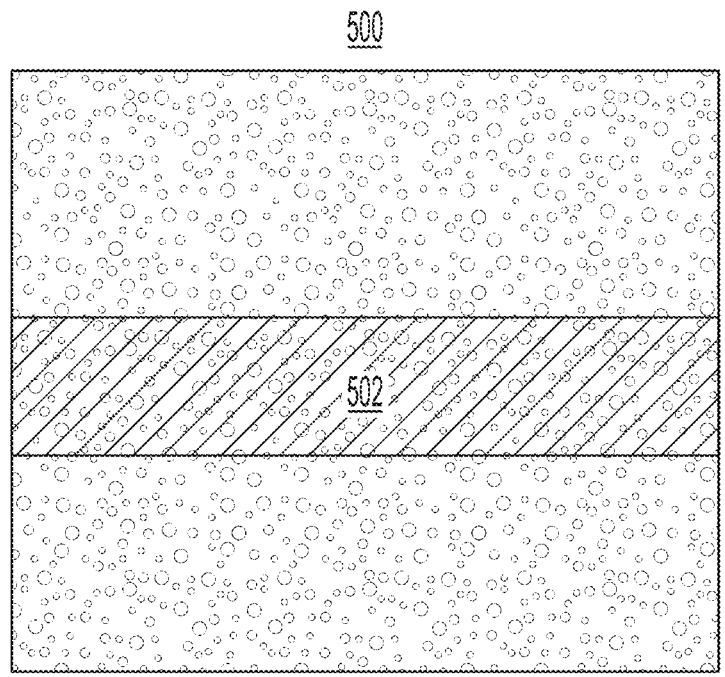
FIG. 5A show a composite structure that includes a bond prior to activation of the gas gun.
Figure 5B:
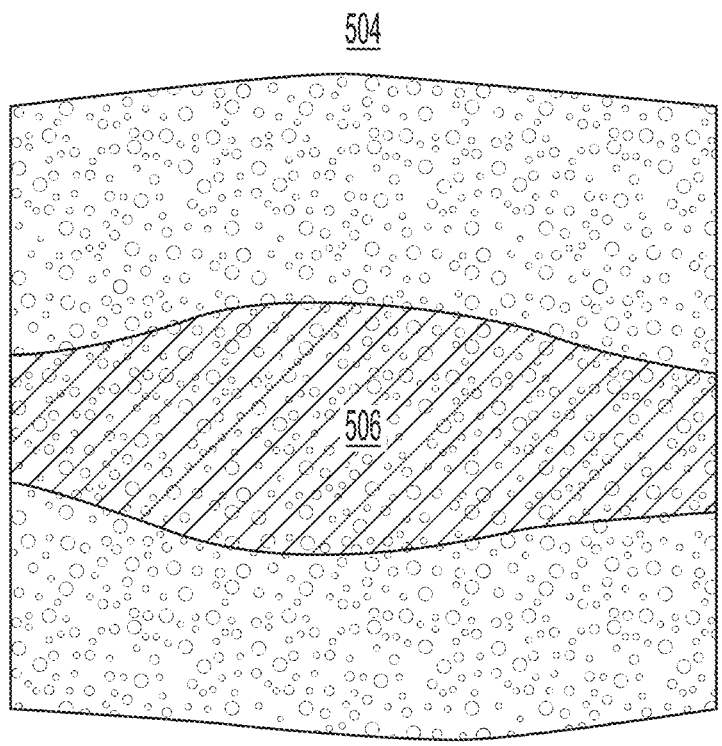
FIG. 5B shows a composite structure 504 that includes a bond during activation of the gas gun.
Figure 5C:
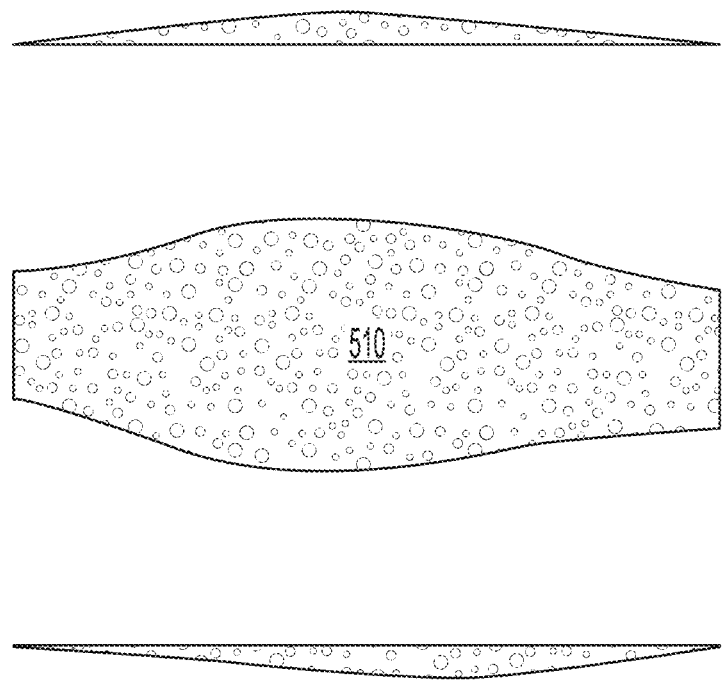
FIG. 5C shows the subtraction of FIG. 5B from FIG. 5A.

FIGS. 5A and 5B show examples X-ray images of the bond lines. FIG. 5A show composite structure 500 that includes bond 502 prior to activation of the gas gun and FIG. 5B shows composite structure 504 that includes bond 506 during activation of the gas gun. FIG. 5C shows the results 508 of the subtraction of FIG. 5B from 5A showing bond changes 512. As discussed above, by applying the compression shockwave to the surface of the part being inspected, the compression wave travels into the material of the part and bounces back from the back surface of the material as a tension wave. As it passes through the bond, it pulls the bond in a tension manner. The part is then x-rayed at that point. The x-ray image is taken under tension and subtracted from an original image without tension. By subtracting the before and after x-ray images, any anomalies that exist can be determined in the bond. The bond strength can also be determined based on bond movement to the tension test. The less the bond moves, the stronger the bond. In addition, if the bond becomes disjoint, this is also indicative of a less strong bond or an anomalous/contaminated bond. The x-ray image subtraction process is a process whereby a digital numeric value of one pixel or whole image is subtracted from another image, which can be used to detect changes between two images.

Figure 6:
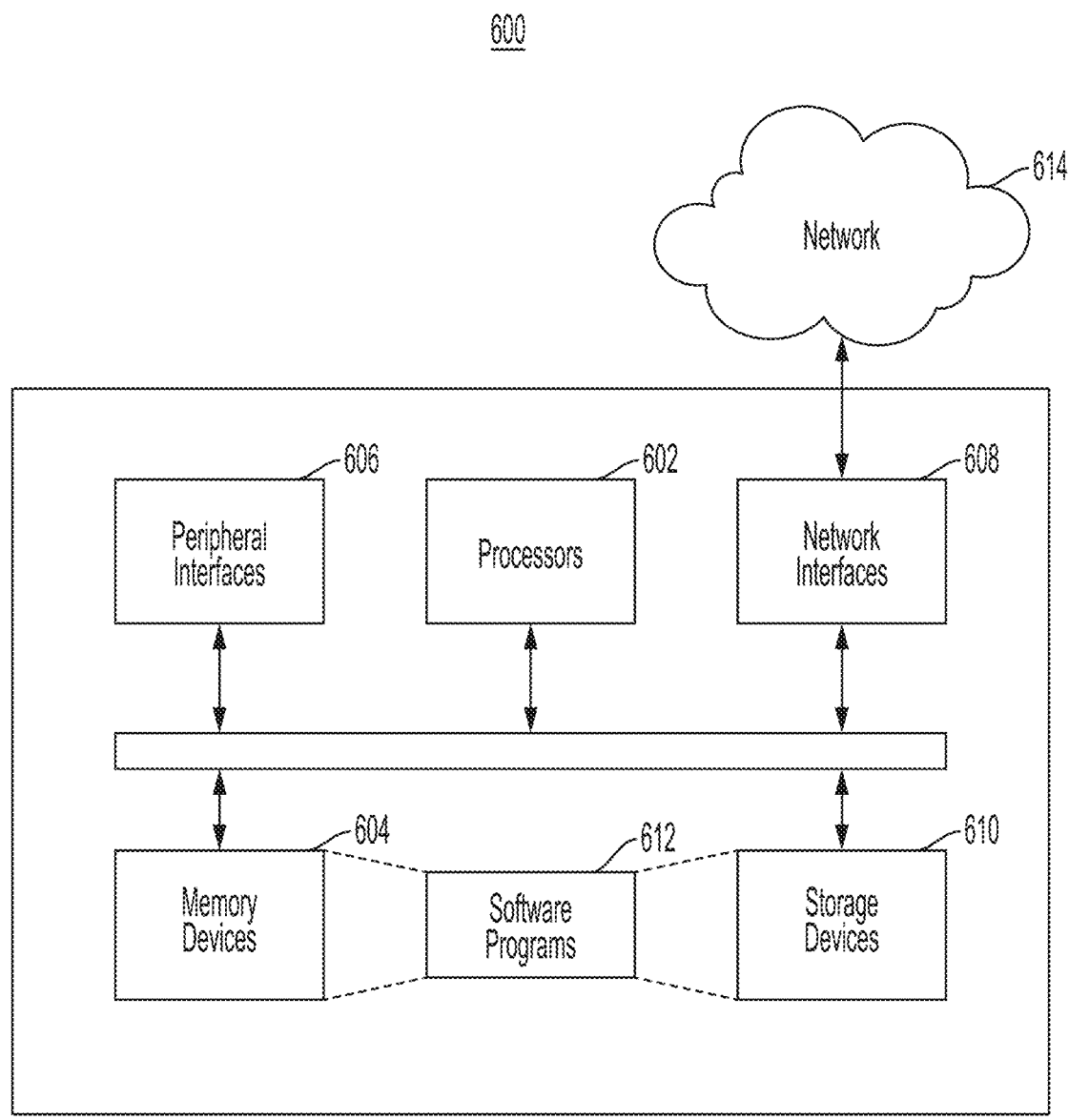
FIG. 6 is an example of a hardware configuration for a computer device.

FIG. 6 is an example of a hardware configuration for a computer device 600, which can be used to as image processor control unit 124 and configured to perform one or more of the processes described above. The computer device 600 can be any type of computer devices, such as desktops, laptops, servers, etc., or mobile devices, such as smart telephones, tablet computers, cellular telephones, personal digital assistants, etc. As illustrated in FIG. 6, the computer device 600 can include one or more processors 602 of varying core configurations and clock frequencies. The computer device 600 can also include one or more memory devices 604 that serve as a main memory during the operation of the computer device 600. For example, during operation, a copy of the software that supports the above-described operations can be stored in the one or more memory devices 604. The computer device 600 can also include one or more peripheral interfaces 606, such as keyboards, mice, touchpads, computer screens, touchscreens, etc., for enabling human interaction with and manipulation of the computer device 600.

The computer device 600 can also include one or more network interfaces 608 for communicating via one or more networks, such as Ethernet adapters, wireless transceivers, or serial network components, for communicating over wired or wireless media using protocols. The computer device 600 can also include one or more storage devices 610 of varying physical dimensions and storage capacities, such as flash drives, hard drives, random access memory, etc., for storing data, such as images, files, and program instructions for execution by the one or more processors 602.

Additionally, the computer device 600 can include one or more software programs 612 that enable the functionality described above. The one or more software programs 612 can include instructions that cause the one or more processors 602 to perform the processes, functions, and operations described herein, for example, with respect to the processes of FIGS. 2 and 4. Copies of the one or more software programs 612 can be stored in the one or more memory devices 604 and/or on in the one or more storage devices 610. Likewise, the data utilized by one or more software programs 612 can be stored in the one or more memory devices 604 and/or on in the one or more storage devices 610.

In implementations, the computer device 600 can communicate with other devices via a network 614. The other devices can be any types of devices as described above. The network 614 can be any type of network, such as a local area network, a wide-area network, a virtual private network, the Internet, an intranet, an extranet, a public switched telephone network, an infrared network, a wireless network, and any combination thereof. The network 614 can support communications using any of a variety of commercially-available protocols, such as TCP/IP, UDP, OSI, FTP, UPnP, NFS, CIFS, AppleTalk, and the like. The network 614 can be, for example, a local area network, a wide-area network, a virtual private network, the Internet, an intranet, an extranet, a public switched telephone network, an infrared network, a wireless network, and any combination thereof.

The computer device 600 can include a variety of data stores and other memory and storage media as discussed above. These can reside in a variety of locations, such as on a storage medium local to (and/or resident in) one or more of the computers or remote from any or all of the computers across the network. In some implementations, information can reside in a storage-area network ("SAN") familiar to those skilled in the art. Similarly, any necessary files for performing the functions attributed to the computers, servers, or other network devices may be stored locally and/or remotely, as appropriate.

In implementations, the components of the computer device 600 as described above need not be enclosed within a single enclosure or even located in close proximity to one another. Those skilled in the art will appreciate that the above-described componentry are examples only, as the computer device 600 can include any type of hardware componentry, including any necessary accompanying firmware or software, for performing the disclosed implementations. The computer device 600 can also be implemented in part or in whole by electronic circuit components or processors, such as application-specific integrated circuits (ASICs) or field-programmable gate arrays (FPGAs).

If implemented in software, the functions can be stored on or transmitted over a computer-readable medium as one or more instructions or code. Computer-readable media includes both tangible, non-transitory computer storage media and communication media including any medium that facilitates transfer of a computer program from one place to another. A storage media can be any available tangible, non-transitory media that can be accessed by a computer. By way of example, and not limitation, such tangible, non-transitory computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and Blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

The foregoing description is illustrative, and variations in configuration and implementation can occur to persons skilled in the art. For instance, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA), cryptographic co-processor, or other programmable logic device, discrete gate or transistor logic, discrete hardware components, or any combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Further, the disclosure comprises embodiments according to the following clauses:

Clause 1. A system for determining the strength of a bond joining a composite structure (114), the system comprising:
a gas gun configured to produce a short gas pulse directed normal to a surface of the composite structure and that creates a compression wave through the composite structure, wherein the gas gun is arranged at a first angle;
a monochromatic x-ray system configured to produce a monochromatic x-ray that is incident at a second angle to the surface and that passes through the composite structure;
a scintillator screen configured to receive transmitted x-rays that pass through the composite structure;
a mirror configured to receive and radiation emitted from the scintillator screen;
a detector configured to receive radiation from the scintillator screen;
an electronic processor configured to process the radiation detected by the detector;
and a synchronization controller configured to synchronize operation of the gas gun, the monochromatic x-ray system, and the detector.

Clause 2. The system of clause 1, wherein the compression wave is reflected at a second surface of the composite structure and is reflected as a tensile wave.

Clause 3. The system of clause 1 or 2, wherein the synchronization controller is configured to produce a x-ray trigger signal to control activation of the monochromatic x-ray system, a gas gun trigger signal to control activation of the gas gun, and a detector trigger signal to control activation of the detector, such that the detector is operable to receive the radiation from the Scintillator during a first time period prior to activation of the gas gun and a second time period during either propagation of the compression wave first then a tensile wave from the reflection of the tensile wave through the composite structure.

Clause 4. The system of clause 1-3, wherein the gas gun is configured to compress carbon dioxide.

Clause 5. The system of clause 1-4, wherein the angle is between about 30° to about 60°.

Clause 6. The system of clause 1-5, wherein the angle is 45°.

Clause 8. The system of clause 1-6, wherein the compression wave and the x-rays are directed to a same portion of the weak bond line.

Further, the disclosure comprises embodiments according to the following clauses:

Clause 1 A method for determining the strength of a bond joining a composite structure, the method comprising:
producing a short gas pulse by a gas gun that is directed normal to a surface of the composite structure and that creates a compression wave through the composite structure, wherein the gas gun is arranged at a first angle;

producing a monochromatic x-ray by a monochromatic x-ray system to that is incident at a second angle to the surface and that passes through the composite structure;

receiving transmitted x-rays by a scintillator screen through the composite structure;

receiving radiation emitted from the scintillator screen by a mirror;

magnifying the radiation reflected by the mirror by a magnifying lens;

detecting the radiation from the scintillator screen by a detector;

processing the radiation detected by the detector; and synchronizing operation of the gas gun, the monochromatic x-ray system, and the detector.

Clause 2. The method of clause 1, wherein the compression wave is reflected at a second surface of the composite structure and is reflected based as a tensile wave.

Clause 3. The method of clause 1 or 2, wherein the synchronizing produces a x-ray trigger signal to control activation of the monochromatic x-ray system, a gas gun trigger signal to control activation of the gas gun, and a detector trigger signal to control activation of the detector, such that the detector is operable to receive the radiation from the Scintillator during a first time period prior to activation of the gas gun and a second time period during either propagation of the compression wave first then a tensile wave from the reflection of the tensile wave through the composite structure.

Clause 4. The method of clause 1-3, wherein the gas gun is configured to compress carbon dioxide.

Clause 5. The method of clause 1-4, wherein the angle is between about 30° to about 60°.

Clause 6. The method of clause 1-5, wherein the angle is 45°.

Clause 7. The method of clause 1-6, wherein the compression wave and the x-rays are directed to a same portion of the bond.

Further, the disclosure comprises embodiments according to the following clauses:

Clause 1 A method for determining the strength of a bond joining a composite structure, the method comprising:

producing a gas pulse that is directed normal to a surface of the composite structure and that creates a compression wave through the composite structure;

producing a monochromatic x-ray that is incident at an angle to the surface and that passes through the composite structure;

detecting radiation from a scintillator screen based on the x-ray;

processing the radiation based on the detecting;

determining the strength of the bond based on the processing, wherein the gas pulse, the x-ray, and the detecting are synchronized.

Clause 2. The method of clause 1, wherein the compression wave is reflected at a second surface of the composite structure and is reflected based as a tensile wave.

Clause 3. The method of clause 1 or 2, wherein the gas pulse, the x-ray, and the detecting are synchronized by producing a x-ray trigger signal to control activation of a monochromatic x-ray system, a gas gun trigger signal to control activation of a gas gun, and a detector trigger signal to control activation of a detector.

Clause 4. The method of clause 1-3, wherein the detector is operable to receive the radiation from the scintillator screen during a first time period prior to activation of the gas gun and a second time period during either propagation of the compression wave first then a tensile wave from the reflection of the tensile wave through the composite structure.

Clause 5. The method of clause 1-4, wherein the angle is between about 30° to about 60°.

Clause 6. The method of clause 1-5, wherein the compression wave and the x-ray are directed to a same portion of the bond.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A system for determining the strength of a bond joining a composite structure, the system comprising:
   a gas gun configured to produce a short gas pulse directed normal to a surface of the composite structure and that creates a compression wave through the composite structure, wherein the gas gun is arranged at a first angle;
   a monochromatic x-ray system configured to produce a monochromatic x-ray that is incident at a second angle to the surface and that passes through the composite structure;
   a scintillator screen configured to receive transmitted x-rays that pass through the composite structure;
   a mirror configured to receive and radiation emitted from the scintillator screen;
   an optical lens configured to receive and radiation reflected by the mirror;
   a detector configured to receive the radiation from the optical lens;
   an electronic processor configured to process the radiation detected by the detector; and
   a synchronization controller configured to synchronize operation of the gas gun, the monochromatic x-ray system, and the detector.

2. The system of claim 1, wherein the compression wave is reflected at a second surface of the composite structure and is reflected as a tensile wave.

3. The system of claim 1, wherein the synchronization controller is configured to produce a x-ray trigger signal to control activation of the monochromatic x-ray system, a gas gun trigger signal to control activation of the gas gun, and a detector trigger signal to control activation of the detector, such that the detector is operable to receive the radiation from the Scintillator during a first time period prior to activation of the gas gun and a second time period during either propagation of the compression wave first then a tensile wave from the reflection of the tensile wave through the composite structure.

4. The system of claim 1, wherein the gas gun is configured to compress carbon dioxide.

5. The system of claim 1, wherein the angle is between about 30° to about 60°.

6. The system of claim 1, wherein the angle is 45°.

7. The system of claim 1, wherein the compression wave and the x-rays are directed to a same portion of the bond.

8. A method for determining the strength of a bond joining a composite structure, the method comprising:
   producing a short gas pulse by a gas gun that is directed normal to a surface of the composite structure and that creates a compression wave through the composite structure, wherein the gas gun is arranged at a first angle;
   producing a monochromatic x-ray by a monochromatic x-ray system to that is incident at a second angle to the surface and that passes through the composite structure;
   receiving transmitted x-rays by a scintillator screen through the composite structure;
   receiving radiation emitted from the scintillator screen by a mirror;
   magnifying the radiation reflected by the mirror by an optical lens;
   detecting the radiation from the Scintillator by a detector;
   processing the radiation detected by the detector; and
   synchronizing operation of the gas gun, the monochromatic x-ray system, and the detector.

9. The method of claim 8, wherein the compression wave is reflected at a second surface of the composite structure and is reflected based as a tensile wave.

10. The method of claim 8, wherein the synchronizing produces a x-ray trigger signal to control activation of the monochromatic x-ray system, a gas gun trigger signal to control activation of the gas gun, and a detector trigger signal to control activation of the detector, such that the detector is operable to receive the radiation from the Scintillator during a first time period prior to activation of the gas gun and a second time period during either propagation of the compression wave first then a tensile wave from the reflection of the tensile wave through the composite structure.

11. The method of claim 8, wherein the gas gun is configured to compress carbon dioxide.

12. The method of claim 8, wherein the angle is between about 30° to about 60°.

13. The method of claim 8, wherein the angle is 45°.

14. The method of claim 8, wherein the compression wave and the x-rays are directed to a same portion of the bond.

15. A method for determining the strength of a bond joining a composite structure, the method comprising:
   producing a gas pulse that is directed normal to a surface of the composite structure and that creates a compression wave through the composite structure;
   producing a monochromatic x-ray that is incident at an angle to the surface and that passes through the composite structure;
   detecting radiation from a scintillator screen based on the x-ray;
   processing the radiation based on the detecting; and
   determining the strength of the bond based on the processing, wherein the gas pulse, the x-ray, and the detecting are synchronized.

16. The method of claim 15, wherein the compression wave is reflected at a second surface of the composite structure and is reflected based as a tensile wave.

17. The method of claim 15, wherein the gas pulse, the x-ray, and the detecting are synchronized by producing a x-ray trigger signal to control activation of a monochromatic x-ray system, a gas gun trigger signal to control activation of a gas gun, and a detector trigger signal to control activation of a detector.

18. The method of claim 17, wherein the detector is operable to receive the radiation from the scintillator screen during a first time period prior to activation of the gas gun and a second time period during either propagation of the compression wave first then a tensile wave from the reflection of the tensile wave through the composite structure.

19. The method of claim 15, wherein the angle is between about 30° to about 60°.

20. The method of claim 15, wherein the compression wave and the x-ray are directed to a same portion of the bond.

* * * * *